US007184153B2

(12) United States Patent
Leonhardt

(10) Patent No.: US 7,184,153 B2
(45) Date of Patent: Feb. 27, 2007

(54) METHOD FOR DETERMINING A PRINTING-IMAGE POSITION, AND MONITORING DEVICE FOR A PRINTING MACHINE

(75) Inventor: Holger Leonhardt, Bammental (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 804 days.

(21) Appl. No.: 09/894,674

(22) Filed: Jun. 28, 2001

(65) Prior Publication Data

US 2002/0024681 A1 Feb. 28, 2002

(30) Foreign Application Priority Data

Jun. 28, 2000 (DE) ................................ 100 31 509

(51) Int. Cl.
*G06F 15/00* (2006.01)
*G06K 7/00* (2006.01)

(52) U.S. Cl. .................. 358/1.12; 358/3.26; 358/1.18; 358/1.5

(58) Field of Classification Search ............... 358/1.12, 358/1.18, 3.26, 1.5; 382/151
See application file for complete search history.

(56) References Cited

U.S. PATENT DOCUMENTS 4,965,597 A * 10/1990 Ohigashi et al. ............ 347/118
5,510,877 A * 4/1996 deJong et al. ................ 399/38
6,008,826 A * 12/1999 Foote et al. ................ 347/116
6,128,106 A * 10/2000 Watanabe et al. ........... 358/498
6,429,945 B1 * 8/2002 Loffler ....................... 358/1.12

FOREIGN PATENT DOCUMENTS

DE 44 01 900 C2 7/1995

* cited by examiner

*Primary Examiner*—King Y. Poon
(74) *Attorney, Agent, or Firm*—Laurence A. Greenberg; Werner H. Stemer; Ralph E. Locher

(57) ABSTRACT

A method for determining a position of a printing image on a piece of printed material in a printing machine includes the steps of acquiring, by a first optical sensor, a mark disposed on the piece of printed material; acquiring, by a second optical sensor, an edge of the piece of printed material; and calculating, by an evaluation unit, a spaced distance of the mark from the edge; and a monitoring device for the printing machine.

14 Claims, 5 Drawing Sheets

METHOD FOR DETERMINING A PRINTING-IMAGE POSITION, AND MONITORING DEVICE FOR A PRINTING MACHINE

BACKGROUND OF THE INVENTION

Field of the Invention

The invention relates to a method for determining a printing-image position on a piece of printing material, and a monitoring device for monitoring a printing-image position on a piece of printing material.

For precisely positioning a printing image on a piece of printing material, it is necessary to monitor and, if necessary or desirable, to correct the position of the printing image. From the published German Patent Document DE 44 01 900 C2, a method has become known for controlling the position of a printing image on a sheet in a sheet-fed printing press wherein the sheet is conveyed, printed, and monitored with respect to a deviation of the position of the printing image from sheet edges with regard to spacing and parallel positioning relative to a nominal or desired condition or phase. If necessary, suitable adjusting or positioning elements are manipulated, and the position of the printing image is thereby corrected. For performing the method, an image recording system is arranged along the conveying path of the sheet, for obtaining image signals over the surface of the entire sheet. From the image signals, the spacing and the parallelism of the printing image to the edges of the sheet are derived, and deviations from nominal or setpoint values are determined. From the deviations, positioning signals for a corrective orientation of the printing image on the sheet are determined by the adjusting or positioning elements.

The herein afore described method is relatively expensive, however, because the entire surface of the sheet must be acquired by the image recording system in order to enable an evaluation of the position of the image on the sheet.

SUMMARY OF THE INVENTION

It is accordingly an object of the invention to provide a method for determining the position of a printing image on a piece of printing material, which is considerably simpler than the heretoforeknown method.

With the foregoing and other objects in view, there is therefore provided, in accordance with one aspect of the invention, a method for determining a position of a printing image on a piece of printed material in a printing machine, which comprises the steps of acquiring, by a first optical sensor, a mark disposed on the piece of printed material; acquiring, by a second optical sensor, an edge of the piece of printed material; and calculating, by an evaluation unit, a spaced distance of the mark from the edge.

In accordance with another mode, the method of the invention includes comparing the spaced distance of the mark, which has been calculated by the evaluation unit, with a prescribed nominal spaced distance, and emitting an output signal if the calculated spaced distance deviates from the nominal spaced distance by more than a prescribed value.

In accordance with a further mode, the method of the invention includes forming the output signal as a positioning signal, and feeding the positioning signal to an adjustment device for controlling positioning organs for determining the position of the piece of printing material in the printing machine.

In accordance with an added mode, the method of the invention includes moving the piece of printed material past the first and the second optical sensor in a prescribed direction of motion and with a predetermined velocity, determining the spaced distance between the first and the second optical sensor in the direction of motion, determining the time span between acquiring the edge and acquiring the mark, and calculating a spaced distance of the edge from the mark, from the time span, the spaced distance between the optical sensors, and the velocity.

In accordance with an additional mode, the method of the invention includes acquiring, by a third and a fourth optical sensor, an additional mark and the edge of the piece of printing material in vicinity of a side edge thereof disposed opposite the first and the second optical sensor, determining the spaced distance of the additional mark from the edge of the piece of printed material, comparing the spaced distance of the mark from the edge with the spaced distance of the additional mark from the edge, and emitting an output signal if the spaced distance of the mark from the edge and the spaced distance of the additional mark from the edge deviate from one another by more than a prescribed value.

In accordance with yet another mode, the method of the invention includes storing the spaced distance of the mark from the edge of a plurality of pieces of printed material, and determining a mean value for the spaced distance of the mark.

In accordance with yet a further mode, the method of the invention includes providing as the mark a reference mark for adjusting partial printing images.

In accordance with yet an added mode, the method includes storing the spaced distance for taking it into account in a further processing of the piece of printing material.

In accordance with yet an additional mode, the method includes taking over the nominal spaced distance of the mark from the edge of the sheet by a printing stage.

In accordance with another aspect of the invention, there is provided a monitoring device for a sheet-fed printing machine, comprising a transport device for moving a piece of printing material in a prescribed direction of motion; a first optical sensor for acquiring a mark disposed on the piece of printing material, a second optical sensor for acquiring an edge of the piece of printing material; an acquisition unit for determining the velocity of the piece of printing material; and an evaluation unit for calculating a. a spaced distance between the mark and the edge from the chronological spacing between acquiring the edge and acquiring the mark,
b. at least one of the velocity and the position of the piece of printing material, and
c. the determined spaced distance between the first and the second optical sensor, the spaced distance being parallel to the direction of motion of the piece of printing material.

In accordance with a further feature of the monitoring device of the invention, there is included a data storage unit for storing therein, by the evaluation unit, spaced distances of a plurality of pieces of printed material, the evaluation unit serving for calculating a mean value for the spaced distance of the mark from the edge of a plurality of pieces of printing material.

In accordance with an added feature of the monitoring device of the invention, the first and the second optical sensors are disposed on one structural member or component.

In accordance with an additional feature, the monitoring device of the invention includes a movement device for moving one of the first, the second, the third, and the fourth optical sensors.

In accordance with yet another feature, one of the second and the third optical sensors includes a first and a second transmitter disposed at a prescribed spaced distance from one another and, disposed between the first and the second transmitter, is a receiver for monitoring an observation point, the transmitters serving for emitting a light signal impinging on the observation point.

In accordance with a concomitant feature, the monitoring device includes a switch for activating one of the first and the second transmitters.

Thus, only the edge of the piece of printing material and a mark that is located on the piece of printing material are acquired optically, and a spacing or spaced distance of the mark from the edge of the piece of printing material is calculated. This method is relatively simple, because information concerning the position of the printing image is obtained by correlating the mark with the rest of the printing image and with the spacing or spaced distance between the edge of the piece of printing material and the mark.

Preferably, the spacing of the mark from the edge is compared with a nominal spacing or spaced distance and an output signal is emitted if the spacing or spaced distance deviates from the nominal spacing or spaced distance by more than a prescribed value. In this way, an evaluation of the position of the printing image is performed in a relatively simple manner.

The output signal is preferably formed as a positioning signal that is fed to a positioning device. Corresponding with the positioning signal, the positioning device controls positioning organs or devices which, in turn, correct the position of the piece of printing material in the printing machine, thereby achieving a precise position of the printing image on the piece of printing material.

The spacing of the mark from the edge of the piece of printing material is preferably calculated by measuring the times at which the edge of the piece of printing material and the mark are acquired by a respective optical sensor. From the difference of the times and from the velocity of the piece of printing material, the spacing of the mark from the edge is calculated. Due to the optical acquisition of the edge and of the mark, and the use of the velocity of the piece of printing material, this method is relatively precise.

Preferably, the edge and the mark are additionally acquired in the vicinity of a second longitudinal side of the piece of printing material, and the spacing of the mark from the edge at the second longitudinal side is determined, thereby enabling a judgment regarding a diagonal error of the printing image.

For a statistical evaluation of the position of the printing image, a mean value over the spacing of the mark from the edge of a plurality of sheets is preferably calculated.

The monitoring device offers the advantage that a first and a second optical sensor serve to acquire the edge and the mark, and that the spacing of the mark from the edge is calculated from the velocity of the piece of printing material, the relative spacing between the first and the second optical sensor, and the chronological difference between the acquisition of the edge and the acquisition of the mark. In this way, the monitoring device is of relatively simple construction and operates in a reliable manner.

Preferably, a data memory device is provided wherein the spacings between the mark and the edge of a plurality of pieces of printing material are stored. From the stored spacings, an evaluation unit calculates a mean value for the spacing of the mark from the edge of a plurality of pieces of printing material.

Preferably, the first and the second optical sensor are arranged on one structural member or component. In this way, the relative position between the first and the second optical sensor is defined and is precisely predetermined.

In a further specific embodiment of the invention, the first and the second optical sensors, respectively, are arranged so as to be movable transverse to the direction of motion of the piece of printing material. This offers the advantage that the sensors can be adapted to different lateral spacings of the marks from the longitudinal side of the piece of printing material. In this way, sheets of different formats can also be monitored.

Preferably, the first optical sensor has a first and a second transmitter which are situated at a prescribed spacing from one another. Between the first and the second transmitters, a receiver is situated which acquires a light signal emitted by the transmitters, after it has been reflected from the piece of printing material. In addition, a switch is provided with which either the first or the second transmitter can be activated. This system offers the advantage that the edge of the piece of printing material is reliably acquired even if grippers hold the piece of printing material in the vicinity or region of the edge of the piece of printing material, the spacing of the first and second transmitter being selected in such a manner that a beam of light of a transmitter always falls on an edge of the piece of printing material and is reflected by the receiver. In this way, the position of the first optical sensor can be obstructed and displaced independently of the arrangement of the grippers in the printing machine. This enables a greater degree of flexibility, independently of the construction of the printing machine.

Other features which are considered as characteristic for the invention are set forth in the appended claims.

Although the invention is illustrated and described herein as embodied in a method for determining a position of a printing image, and a monitoring device for a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1A:
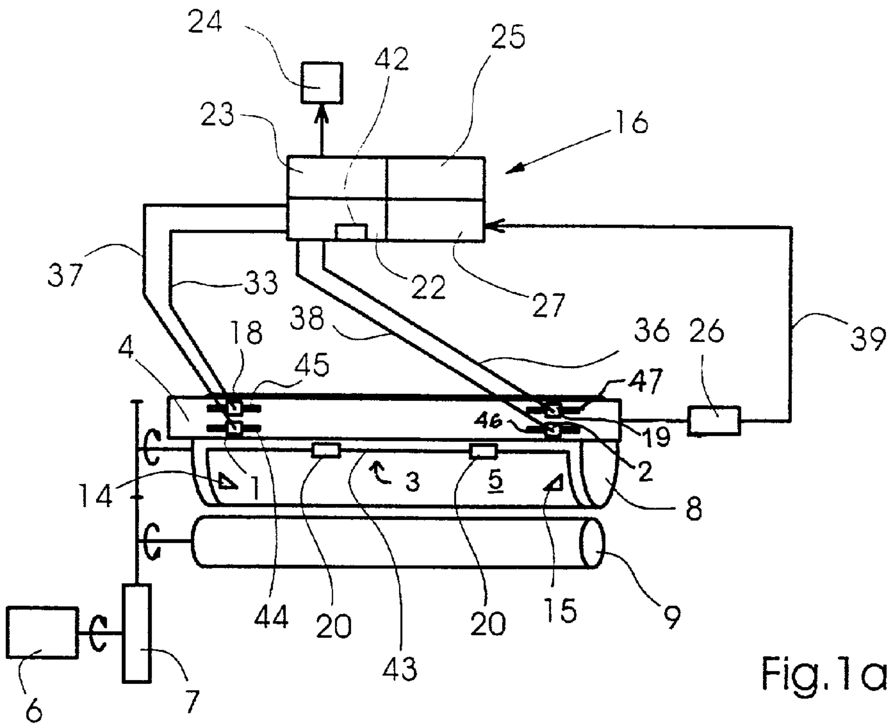
FIG. 1*a* is a schematic and diagrammatic view, partly perspective, of a sheet-fed printing press.

Referring now to the drawings and, first, particularly to FIG. 1*a* thereof, schematically and diagrammatically illustrating a sheet-fed rotary printing machine provided with a sheet 5 that is clamped between a first and a second transport cylinder 8 and 9, and that is moved through the sheet-fed printing press by rotation of the first and the second transport cylinders 8 and 9. The first and the second transport cylinders 8 and 9 are connected to a drive 6 by a gear transmission 7. The drive 6 drives the first and the second transport cylinders 8 and 9 with a suitably prescribed angular velocity. In addition, an angle transmitter 26 is disposed on the first transport cylinder 8 and acquires the angular velocity of first transport cylinder 8 and forwards it to a position observation unit 27 via a fifth measurement line 39.

Located above the first transport cylinder 8 is a holder 4 to which a first and a second optical sensor 1 and 18 are fastened. The first and the second optical sensors 1 and 18 are situated in the vicinity of a side edge of the respective sheet 5. The sheet 5 is held at the leading edge thereof by grippers 20, so that the sheet 5 lies on the first transport cylinder 8 and executes a motion in the direction of rotation of the first transport cylinder 8. In a further development of the invention, parallel to the first and to the second optical sensor, a third and a fourth optical sensor 19 and 2 are located in the vicinity of a second side edge of the sheet 5 and are fastened to the holder 4. The third optical sensor 19 and the fourth optical sensor 2 are situated above the first transport cylinder 8.

On the sheet 5, a first and a second mark 14 and 15 are provided at a distance from the side edges of the sheet 5. The first and the second mark 14 and 15 are preferably part of a printing image and, respectively, provide a reference mark for the position of the printing image. The first and the second mark 14 and 15 are preferably part of a register by which the position relative to one another of parts of printing images are determined. In the case of a multicolor printing image, a first and a second mark can be arranged for each color, for example, on the sheet 5. This enables the monitoring of the position of the differently colored printing-image parts relative to one another.

In the simplest case, the first and the second mark 14 and 15 are formed as black squares. The first optical sensor 1 and the fourth optical sensor 2, respectively, are spaced a distance from the respectively assigned side edges of the sheet 5 which correspond to the spacings of the first and of the second mark 14, 15 from the respective lateral edges of the sheet 5. In this way, assurance is provided that the first and the second marks 14 and 15, respectively, of a sheet 5 that moves past beneath the first and the fourth optical sensors 1 and 2, respectively, are acquired by the first and the fourth optical sensors 1 and 2. In a further development of the invention, the optical sensors 1, 2, 18 and 19 are constructed so as to be displaceable along the longitudinal axis of the first transport cylinder 8, so that the position of the optical sensors 1 and 2 can be matched to the position of the marks 14 and 15, respectively.

The position of the second and the third optical sensors 18 and 19, respectively, relative to the side edges of the sheet 5 should preferably be at the same spacing as the first and the fourth optical sensors 1 and 2, respectively, relative thereto. In this specific embodiment, the first and the second optical sensors 1 and 18, and the third and the fourth optical sensors 2 and 19 lie on an axis parallel to the direction of motion 3 of the sheet 5, which makes possible a precise measurement of the spacing of the mark from an edge 43 of the sheet 5. Even when there is a disadjustment of the sheet 5, wherein the side edges of the sheet 5 are not situated parallel to the direction of motion of the sheet 5, this error is minimized due to the disposition of the first and the second optical sensors 1 and 18, on the one hand, and the fourth and the third optical sensors 2 and 19, on the other hand, respectively, along the axis of motion of the sheet 5.

Adequate accuracy is also achieved if the second and the third optical sensors 18 and 19, respectively, have a greater or lesser spacing from the side edges of the sheet 5 than do the first and the fourth optical sensors 1 and 2, respectively.

The first, second, third and fourth optical sensors 1, 18, 2 and 19, respectively, are connected to an evaluation unit 22 via a third measurement line 37, a first measurement line 33, a fourth measurement line 38 and a second measurement line 36.

Figure 1B:
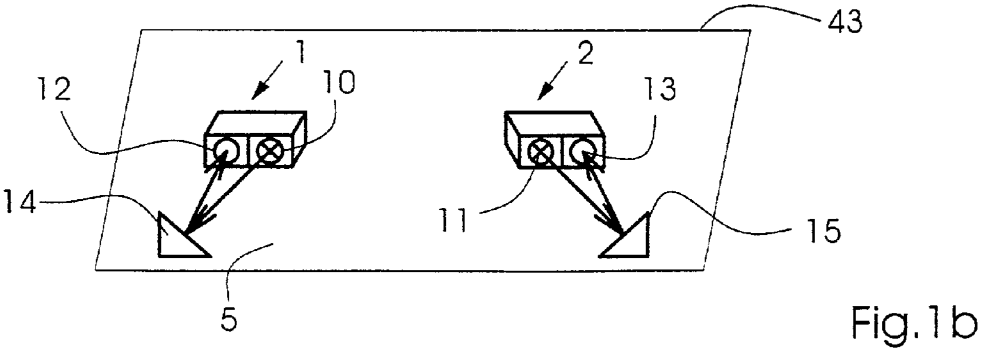
FIG. 1*b* is an enlarged fragmentary view of FIG. 1*a* showing reference marks for the position of a printing image, and respective sensors for detecting the marks.

FIG. 1*b* provides a detailed representation of the first and the fourth optical sensors 1 and 2, respectively. The first optical sensor 1 and the fourth optical sensor 2, respectively, have a first light source 10 and a second light source 11, respectively, and a first receiver 12 and a second receiver 13, respectively. The first and the second light sources 10 and 11, respectively, send a light signal in a direction towards the sheet 5. The light signal impinges on the sheet 5 at an observation point P (note FIG. 3). The observation point P is monitored by a first and a second receiver 12 and 13, respectively. The light signal acquired by the first and the second receiver 12 and 13, respectively, at the observation point P changes when a respective mark 14, 15 appears at the observation point P. The first and the second receiver 12 and 13, respectively, forwards the acquired signal to the evaluation unit 22. In this way, the time at which the front edge of the first and the second mark 14 and 15, respectively, appears under the first and the fourth optical sensor 1 and 2, respectively, is acquired by the evaluation unit 22.

In a simple embodiment, the second and the third optical sensor 18 and 19, respectively, are constructed in a manner corresponding to the first and the fourth optical sensor 1 and 2. If a leading edge of the sheet 5 appears under the second and the third optical sensor 18 and 19, the second and the third optical sensor 18 and 19 change the output signal that is fed to the evaluation unit 22.

In this way, via a modification or change in the measurement signal fed from the second and the third optical sensor 18 and 19, respectively, the evaluation unit 22 acquires the instant of time at which the edge 43 of the sheet 5 appears under the second and the third optical sensor 18 and 19, respectively. The edge 43 represents the leading edge of sheet 5, as viewed in the direction of motion represented by the arrow 3.

Via the angle transmitter 26, the position observation unit 27 acquires the angular velocity of the second transport cylinder 9, and forwards this angular velocity to the evaluation unit 22. The evaluation unit 22 is connected to a data memory unit 42 wherein the circumference of the first transport cylinder 8 is stored. From the angular velocity and the circumference, the evaluation unit 22 calculates the velocity of motion of the sheet 5. The velocity of motion of the sheet 5 is preferably determined within the time range wherein either the first and the second optical sensor 1 and 2, respectively, or the second and the third optical sensor 18 and 19, respectively, first acquire the appearance of the edge

43 or of the respective mark 14, 15, and wherein the second and the third optical sensor, on the one hand, and the first and the fourth optical sensor, on the other hand, respectively, wait for the acquisition of the mark 14, 15 and of the edge 43, respectively. In this manner, precisely that velocity is acquired which is present in the time range that is significant for the calculation of the spacing of the respective mark 14, 15 from the edge 43.

In the data storage unit 42, the spacings between the first and the second optical sensor 1 and 18, on the one hand, and between the third and the fourth optical sensor 2 and 19, on the other hand, respectively, parallel to the direction of motion represented by the arrow 3 are stored. From the chronological spacing between the detection of the marks 14, 15 and the detection of the edge 43 of the sheet 5, and the distance between the first and the second optical sensor 1, 18, on the one hand, and between the fourth and the third optical sensor 2, 19, on the other hand, respectively, parallel to the direction of motion represented by the arrow 3, and the velocity of the sheet 5, the evaluation unit 22 calculates the spacing of the front edge of the mark 14, 15 to the edge 43 of the sheet 5.

Figure 1C:
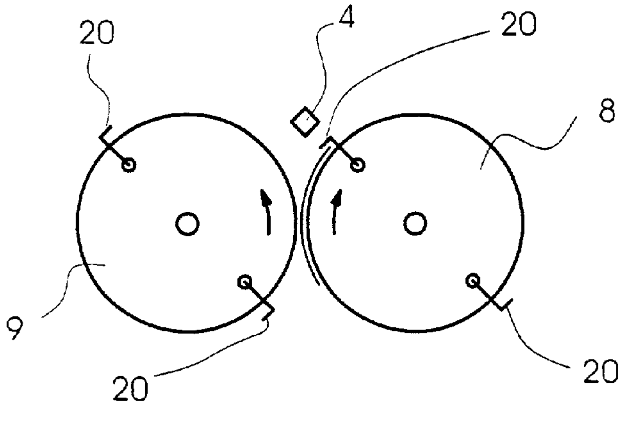
FIG. 1*c* is an enlarged fragmentary side elevational view of FIG. 1*a* showing transport cylinders thereof.

Furthermore, in the data storage unit 42, a nominal or target value is stored for the spacing of the first and the second mark 14, 15, respectively, from the edge 43, and the evaluation unit 22 compares the measured spacing of the first and the second mark 14, 15, respectively, from the prescribed nominal value. If the measured spacing deviates from the nominal value by more than a predetermined value, the evaluation unit 22 issues a positioning signal to a control and regulation device 23, which is in turn connected to a register adjustment device 24. The control and regulation device 23 adjusts the register adjustment device 24 in accordance with the determined deviation of the spacing from the nominal value in such a manner that the spacing of the first and of the second mark 14, 15 is corrected so as to correspond to the predetermined nominal value. Preferably, a display/input device 25 is provided which is connected to the evaluation unit 22. Via the display/input device 25, the then being calculated spacing of the first and the second mark, respectively, from the edge 43 is represented. Preferably, there is indicated via the display/input device 25 whether the spacing of the first and of the second mark 14, 15, respectively, from the edge 43 deviates from the predetermined nominal spacing more than the prescribed value. In addition, the display/input device serves for inputting the nominal spacing and for inputting the value which the spacing of the first and of the second mark 14, 15 from the edge 43 may be in relation to the nominal spacing without having performed a correction of the register adjustment device 24. FIG. 1*c* is an end view of the first and the second transport cylinders 8 and 9.

Figure 2:
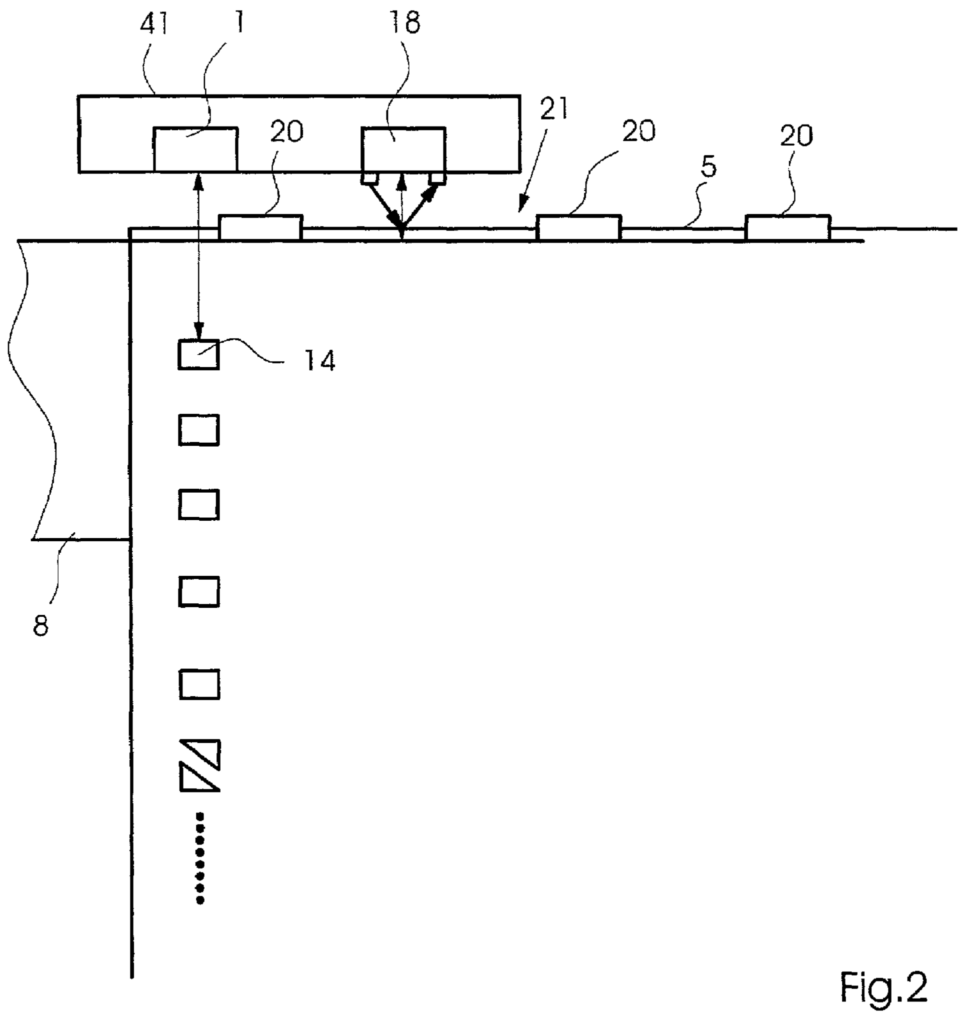
FIG. 2 is a schematic and diagrammatic view of a cylinder with gripper bars, and optical sensors mounted on a structural member in a sheet-fed printing machine.

FIG. 2 shows an embodiment of the invention having a first optical sensor 1 and a second optical sensor 18 installed on a single structural part or component 41. Due to the fixed connection between the first and the second optical sensors 1 and 18, the relative position of the first and the second optical sensors 1 and 18 is precisely defined. Preferably, the structural part 41 is a semiconductor chip with which the first and the second optical sensors 1 and 18 are integrated.

In an advantageous exemplary embodiment, the value of the determined spacing of the respective mark 14, 15 from the leading edge 43 of the sheet 5 is taken into account in a further processing of the sheet 5. For example, in a subsequent punching process, the spacing is taken into account in order to punch out precisely the desired region of the printing image. Preferably, the value of the spacing is stored for each sheet.

FIG. 2 shows the first transport cylinder 8, which has a plurality of grippers 20 distributed over the axially extending side thereof. The grippers 20 are provided for gripping the respective leading edge 43 of the sheet 5, and convey the sheet 5 in a predetermined manner. After the edge 43 of the sheet 5 has been acquired or gripped by the grippers 20, the latter are located between the sheet 5 and the second optical sensor 18 so that the light signal emitted by the second optical sensor 18 falls on a gripper bar 21 if the position of the second optical sensor 18 should not be suitable, so that the edge 43 cannot consequently be detected. This would therefore require a matching of the position of the second optical sensor 18 to the respectively used transport cylinder 9. However, this is relatively expensive and, for this reason, a particular embodiment of the second optical sensor is proposed as shown in FIG. 3.

Figure 3:
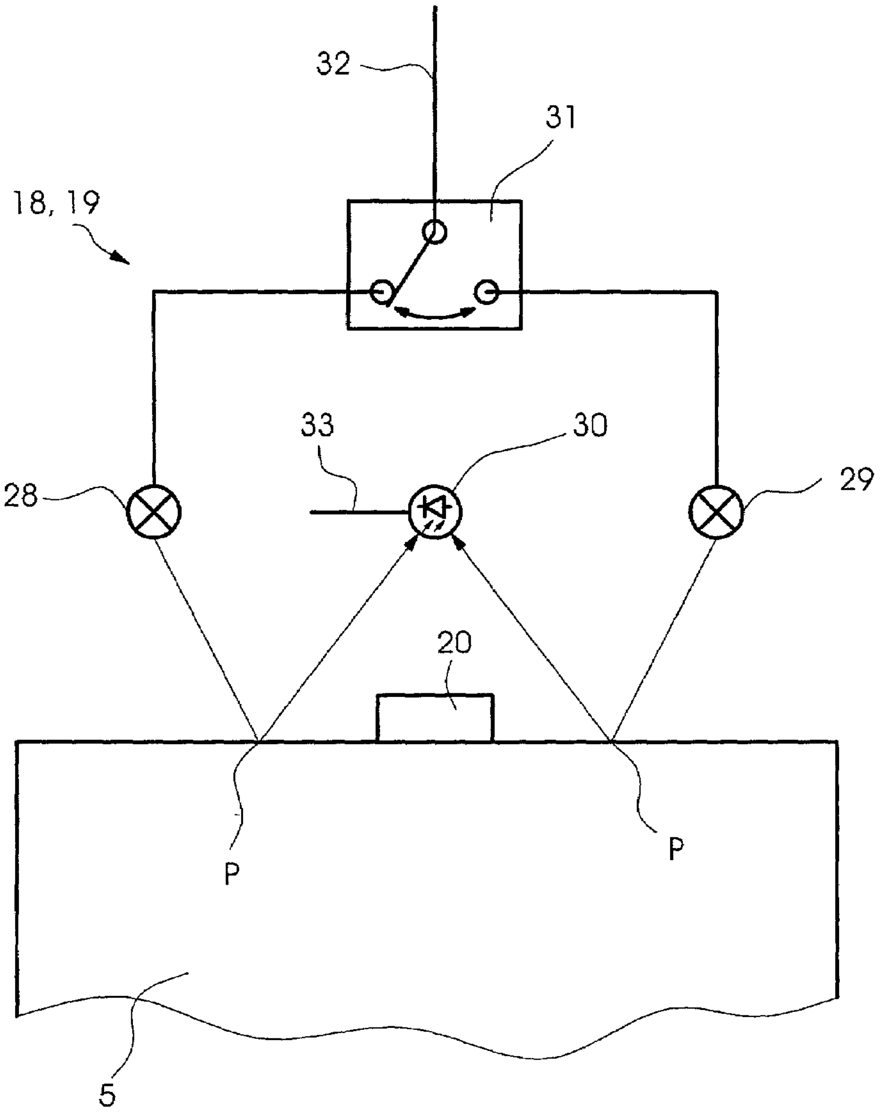
FIG. 3 is a schematic and diagrammatic view of an optical sensor system.

FIG. 3 schematically and diagrammatically illustrates a special exemplary embodiment of a second or third optical sensor 18, 19, which includes a first and a second optical transmitter 28 and 29. The first and the second optical transmitters 28 and 29 are disposed at a prescribed spacing from one another. An optical receiver 30 is located between the first and the second transmitters 28 and 29, respectively. The first and the second optical transmitters 28 and 29 , and the optical receiver 30 are adjusted relative to one another in a manner that a light signal emitted by the first or the second transmitter 28, 29 impinges on an observation point P, and the observation point P is monitored by the optical receiver 30. In this regard, the spacings between the first and the second transmitters 28 and 29, on the one hand, and the location of the optical receiver 30, on the other hand, are selected so that the spacing between the two observation points P at which the light beam of the first and the second transmitter 28, 29 impinges on the sheet 5 is greater than the width of a gripper 20. In this way, assurance is provided that, independently of the type of transport cylinder 8, and of the position of the optical transmitter 28, 29, the second and the third optical sensor 18 and 19 can reliably detect an edge 43 of a sheet 5.

Preferably, in the second and the third optical sensors 18 and 19, respectively, a switch 31 is provided with which either the first or the second transmitter 28, 29 can be switched on. The switch 31 is connected to a control unit 16 (note FIG. 1*a*) via a control line 32. The control unit 16 includes the evaluation unit 22, and the control and regulation device 23. By trial measurements, the control unit 16 can determine which transmitter can be used to acquire the edge 43 of the sheet 5, and can then set the switch 31 so that this transmitter is switched on.

Figure 4:
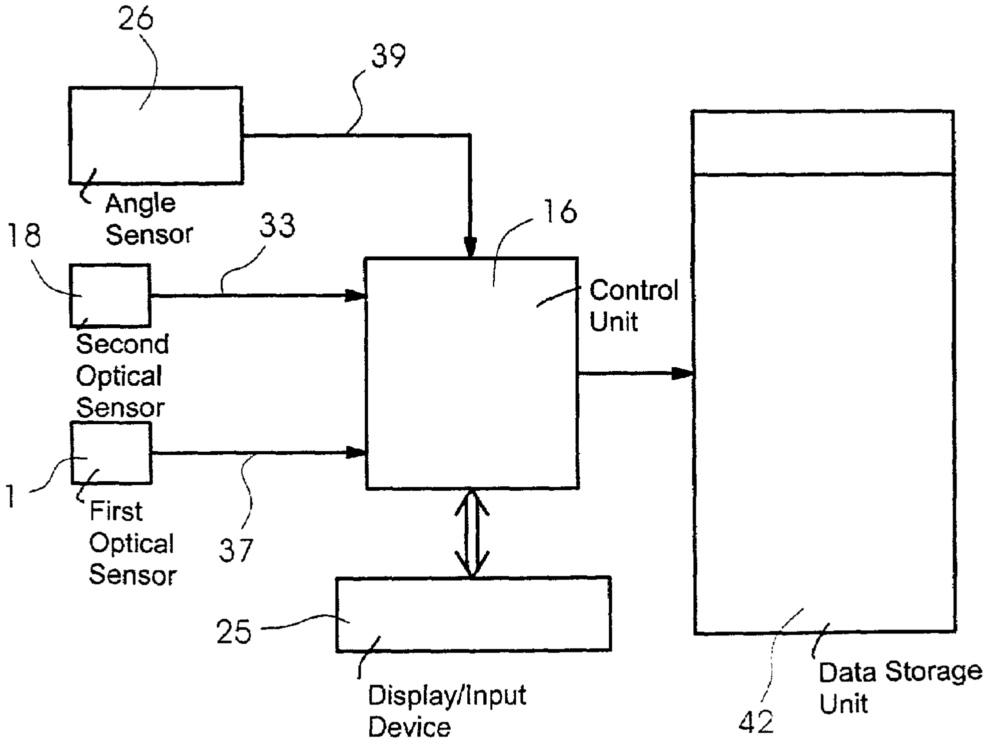
FIG. 4 is a block diagram schematically illustrating a monitoring device.

In a block circuit diagram, FIG. 4 shows the construction of the monitoring device having the angle transmitter 26, the first and the second optical sensors 1 and 18, and the control unit 16 with the data storage unit 42 and the input/output unit 25. In the data storage unit 42, the first instant of time T1 at which the second optical sensor 18 recognizes the respective edge 43 is acquired. In addition, in the data storage unit 42, the second instant of time T2 at which the first optical sensor 1 acquires the edge of the mark 14 is acquired.

These data are stored in the data storage unit 42 for a large number of sheets, and are used by the evaluation unit 22 for calculating a mean value, over a predetermined number of sheets, for the spacing of the respective mark 14, 15 from the edge 43.

Figure 5:
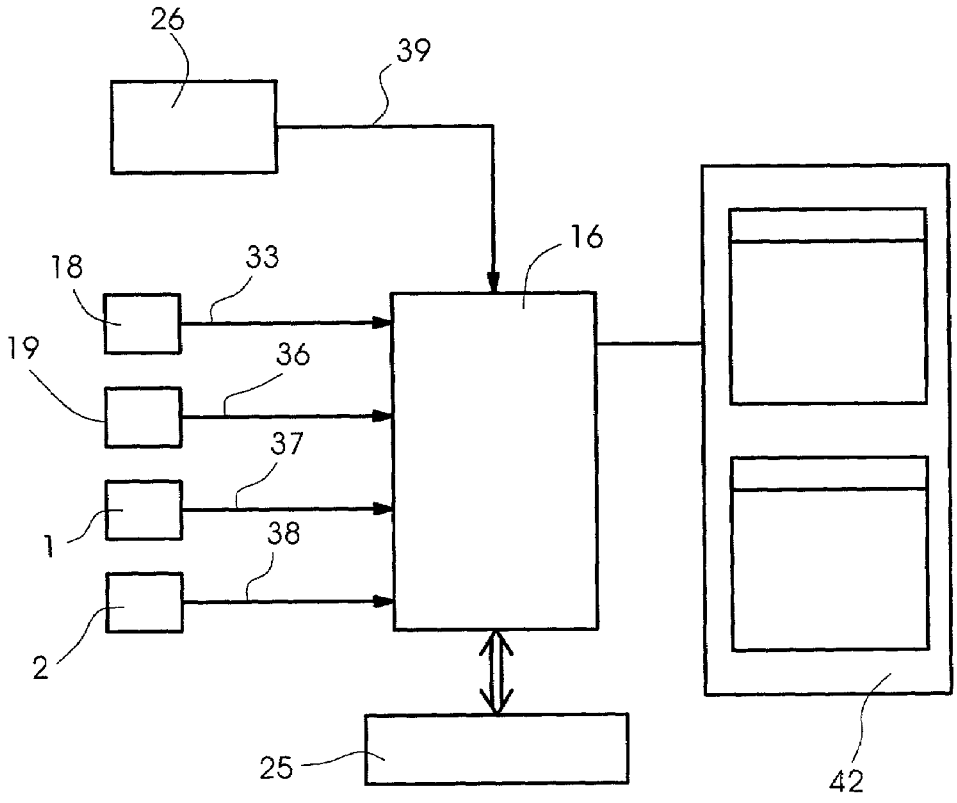
FIG. 5 is a block diagram schematically showing a monitoring device for monitoring the two longitudinal sides of a sheet.

FIG. 5 shows a further embodiment of the monitoring device in the form of a block circuit diagram, corresponding in essence to the system shown in FIG. 1. FIG. 5 differs from FIG. 1 in that a third and a fourth optical sensor 19 and 2, respectively, are provided, with which the mark 15 and the edge 43 can be monitored in the vicinity or region of the second longitudinal sides of the sheet 5. Consequently, the first instant of time T1 at which the edge 43 appears under the second optical sensor 18, the second instant of time T2 at which the front or leading edge of the first mark 14 appears under the first optical sensor 1, the third instant of time T3 at which the edge 43 of the sheet 5 appears under the third optical sensor 19, and the fourth instant of time T4 at which the front or leading edge of the second mark 15 appears under the fourth optical sensor 2, are stored in the data storage unit 42. These data are also stored for a predetermined number of sheets and are used by the evaluation unit 22 for calculating a mean spacing of the first and/or the second mark 14, 15, respectively, from the edge 43 of the sheet 5. In addition, from the comparison between the spacing of the first and the second mark 14, 15, respectively, from the edge 43, information concerning an oblique positioning of the printing image is obtained. If, for example, the spacings between the first and the second marks 14 and 15 do not agree, the printing image on the sheet 5 does not have a precisely parallel orientation to the side edges of the sheet 5. In addition, through the use of two optical sensors 18 and 19 for the detection of the edge 43 of the sheet 5, information concerning the position of the respective sheet 5 in the printing machine can also be obtained. If, for example, the second and the third optical sensors determine that the edge 43 appears at different times under the second and the third optical sensors 18 and 19, this indicates an oblique positioning of the sheet 5, wherein the side edges of the sheet are not oriented precisely parallel to the direction of motion of the sheet. In this regard, it is assumed that the second and the third optical sensors 18 and 19 are situated at the same height and at a right angle to the provided direction of motion of the sheet 5.

In a preferred embodiment, the first, the second, the third, and the fourth optical sensors 1, 18, 2 and 19 are fastened on a first, second, third, and fourth carriage or slide 44, 45, 46 and 47, respectively. The carriages 44, 45, 46 and 47, respectively, are movably attached to the holder 4, and are movable by respective electric motors. The electric motors are connected to the control unit 16. Via a suitable control of the electric motors, the first, the second, the third, and the fourth optical sensors 1, 18, 2 and 19 can be adjusted to different formats of the sheet or to different positions of the marks 14 and 15.

Preferably, the first and the second optical sensors 1 and 18 are disposed on one carriage or slide, and the third and the fourth optical sensors 19 and 2 are disposed on one carriage or slide.

In a preferred embodiment, the nominal spacing of the first and/or the second mark 14 and 15, respectively, from the edge of the sheet is automatically taken over from data of a printing pre-stage.

I claim:

1. A method for determining a position of a printing image on a printed sheet in a printing machine, which comprises the steps of: moving the printed sheet past a first optical sensor and a second optical sensor in a prescribed direction of motion and with a predetermined velocity, determining a spaced distance between the first and the second optical sensor in the direction of motion; acquiring, with the first optical sensor, a mark disposed on the printed sheet; acquiring, with the second optical sensor, a leading edge of the printed sheet; determining a time span between acquiring the leading edge and acquiring the mark; and calculating, with an evaluation unit, a spaced distance of the mark from the leading edge from the time span, the spaced distance between the optical sensors, and the velocity.

2. The method according to claim 1, which includes comparing the spaced distance of the mark, which has been calculated by the evaluation unit, with a prescribed nominal spaced distance, and emitting an output signal if the calculated spaced distance deviates from the nominal spaced distance by more than a prescribed value.

3. The method according to claim 2, which includes forming the output signal as a positioning signal, and feeding the positioning signal to an adjustment device for controlling positioning organs for determining the position of the printed sheet in the printing machine.

4. The method according to claim 1, which includes acquiring, by a third and a fourth optical sensor, an additional mark and the leading edge of the printed sheet in vicinity of a side edge thereof disposed opposite the first and the second optical sensor, determining the spaced distance of the additional mark from the edge of the piece of printed material, comparing the spaced distance of the mark from the edge with the spaced distance of the additional mark from the edge, and emitting an output signal if the spaced distance of the mark from the edge and the spaced distance of the additional mark from the edge deviate from one another by more than a prescribed value.

5. The method according to claim 1, which includes storing the spaced distance of the mark from the edge of a plurality of pieces of printed material, and determining a mean value for the spaced distance of the mark.

6. The method according to claim 1, which includes providing as the mark a reference mark for adjusting partial printing images.

7. The method according to claim 1, which includes storing the spaced distance for taking it into account in a further processing of the piece of printing material.

8. The method according to claim 1, which includes taking over a target spacing of the mark from the edge of the sheet from a printing pre-stage.

9. Monitoring device for a sheet-fed printing machine, comprising a transport device for moving a printed sheet in a prescribed direction of motion; a first optical sensor for acquiring a mark disposed on the printed sheet, a second optical sensor for acquiring a leading edge of the printed sheet; an acquisition unit for determining the velocity of the printed sheet; and an evaluation unit for calculating a. a spaced distance between said mark and said edge from the chronological spacing between acquiring said edge and acquiring said mark;

b. at least one of the velocity and the position of the printed sheet, and c. the determined spaced distance between said first and said second optical sensor, said spaced distance being parallel to the direction of motion of the printed sheet; and a data storage unit for storing therein, by said evaluation unit, spaced distances of a plurality of printed sheets, said evaluation unit serving for calculating a mean value for the spaced distance of said mark from said edge of a plurality of printed sheets.

10. The monitoring device according to claim 9, wherein said first and said second optical sensor are disposed on one structural member or component.

11. The monitoring device according to claim 9, wherein said second optical sensor includes a first and a second transmitter disposed at a prescribed spaced distance from one another and, a receiver for monitoring an observation point disposed between said first and said second transmitter, said transmitters serving for emitting a light signal impinging on said observation point.

12. The monitoring device according to claim 11, including a switch provided for activating one of said first and said second transmitters.

13. The monitoring device according to claim 9, wherein said first optical sensor and said second optical sensor are disposed in a vicinity of a first side edge of the printed sheet and including a third optical sensor and a fourth optical sensor disposed parallel to the first optical sensor and the second optical sensor a vicinity of a second side edge of the printed sheet.

14. The monitoring device according to claim 13, including a movement device for moving one of said first, said second, said third, and said fourth optical sensors.

* * * * *